E. A. ROTH.
Milk Cooling Apparatus.
No. 229,474. Patented June 29, 1880.
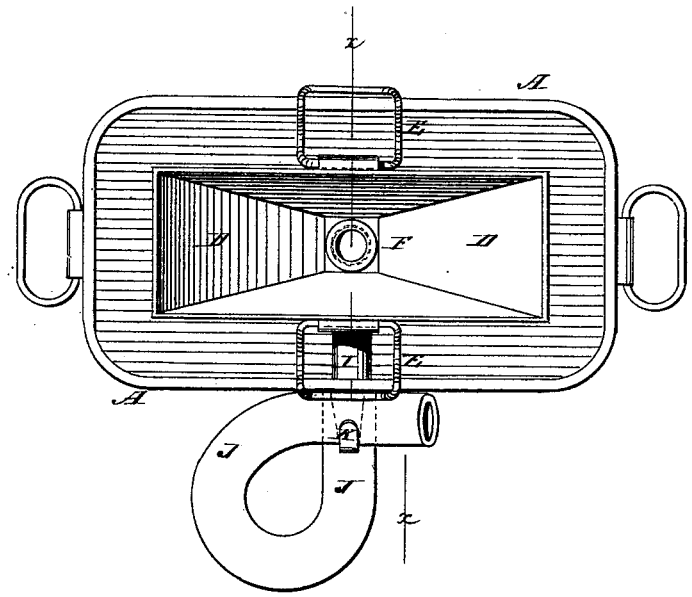
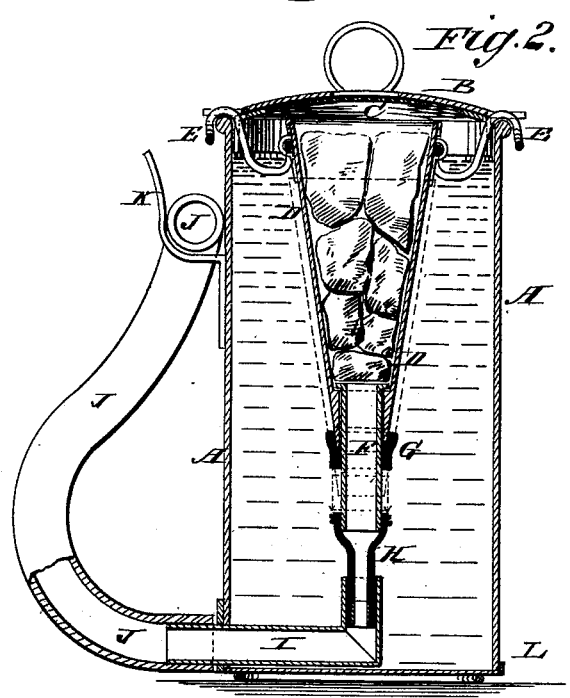
WITNESSES:
Francis McArdle
C. Sedgwick
INVENTOR:
E. A. Roth
BY Munn & Co.
ATTORNEYS.

UNITED STATES PATENT OFFICE.

EDWIN A. ROTH, OF PHILADELPHIA, PENNSYLVANIA.

MILK-COOLING APPARATUS.

SPECIFICATION forming part of Letters Patent No. 229,474, dated June 29, 1880.

Application filed November 1, 1879.

*To all whom it may concern:*

Be it known that I, EDWIN A. ROTH, of Philadelphia, in the county of Philadelphia and State of Pennsylvania, have invented a new and useful Improvement in Milk-Cooling Apparatus, of which the following is a specification.

Figure 1 is a plan view of the improvement, the cover being removed. Fig. 2 is a sectional elevation taken through the line $x\ x$, Fig. 1.

The object of this invention is to furnish milk-cooling apparatus so constructed that the milk will be cooled quickly and that the cream can be conveniently drawn off.

Similar letters of reference indicate corresponding parts.

A represents a tank, of any desired capacity, to receive the milk to be cooled. The tank A is provided with a cover, B, having an opening formed in it, which opening is covered with fine wire-gauze C, so that gases rising from the milk may escape freely. Within the tank A is placed a smaller vessel, D, which has hook-shaped handles E hinged to the upper parts of its sides or ends, to hook upon the upper edge of the tank A or upon rods attached to said tank, and thus suspend the vessel D within the tank A. The vessel D may be made in the shape of an inverted pyramid, or of any other desired shape.

F is a pipe, which passes through a hole in the bottom of the vessel D, and slides watertight in a rubber coupling, G, or other packing. To the lower end of the pipe F is attached the end of a short rubber tube, H, the other end of which is attached to the inner end of the discharge-pipe I, with or without a rubber packing. The discharge-pipe I is bent at right angles, passes along the bottom or side of the tank A, and passes out through a hole in the lower part of the side of the tank A.

To the projecting end of the discharge-tube I is attached the end of a rubber pipe, J, which, when not in use, may be hung upon a hook, K, attached to the upper part of the side of the tank A, to prevent the contents of the vessel D from flowing out through the said tube J.

With this construction ice or other cooling substance is placed in the suspended vessel D, and is thus in the center of the milk, so that the milk will be cooled and the cream caused to rise very quickly. When the milk is sufficiently cooled the contents of the vessel D are drawn off through the pipe J. The hook-handles E are then disengaged from the edge or rods of the tank A, and the vessel D is pressed down beneath the surface of the milk, so that the cream will flow into it over its upper edge and flow out through the pipe J. Or the pipe J may be hung upon the hook K and the cream retained in the vessel D and drawn off when desired.

To the bottom of the tank A is attached a ring, L, to keep the bottom of the tank A from contact with the floor and protect it from wear.

If desired, the sliding pipe F may be omitted and the flexible pipe H made longer and attached directly to the vessel D.

Having thus fully described my invention, I claim as new and desire to secure by Letters Patent—

In a milk-cooler, the combination, with the suspended vessel D, pipe I, and the flexible connecting-pipe H, of the sliding pipe F, substantially as herein shown and described.

EDWIN AUGUSTUS ROTH.

Witnesses:
 HARRY H. LONG,
 GEORGE W. ALLEN,
 W. H. HARDMAN, Jr.